United States Patent
Silvera et al.

(10) Patent No.: US 7,228,391 B2
(45) Date of Patent: Jun. 5, 2007

(54) LOCK CACHING FOR COMPOUND ATOMIC OPERATIONS ON SHARED MEMORY

(75) Inventors: Raul Esteban Silvera, Woodbridge (CA); Robert James Blainey, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 10/864,777

(22) Filed: Jun. 8, 2004

(65) Prior Publication Data

US 2005/0010729 A1    Jan. 13, 2005

(30) Foreign Application Priority Data

Jul. 15, 2003    (CA) .................................... 2435148

(51) Int. Cl.
*G06F 12/14* (2006.01)

(52) U.S. Cl. ................... 711/152; 711/151; 711/158; 711/163; 711/168; 710/36

(58) Field of Classification Search ............... None
See application file for complete search history.

(56) References Cited

U.S. PATENT DOCUMENTS

| | | | |
|---|---|---|---|
| 4,970,643 A | 11/1990 | Cramm | |
| 5,404,482 A | 4/1995 | Stamm et al. | |
| 5,408,629 A | 4/1995 | Tsuchiya et al. | |
| 5,694,567 A | 12/1997 | Bourekas et al. | |
| 5,787,465 A | 7/1998 | Jouppi et al. | |
| 6,088,773 A * | 7/2000 | Kano et al. ............... | 711/611 |
| 6,092,159 A | 7/2000 | Ekner et al. | |
| 6,295,580 B1 | 9/2001 | Sturges et al. | |
| 6,829,698 B2 * | 12/2004 | Arimilli et al. ............. | 712/208 |
| 6,829,762 B2 * | 12/2004 | Arimilli et al. ............. | 718/1 |
| 2003/0018855 A1 | 1/2003 | McWilliams et al. | |

OTHER PUBLICATIONS

Hitachi Data Systems. "*Hitachi Freedom Storage. Lightning 9900 V Series Architecture Guide,*" Title and Copyright (2 pages); Table of Contents (pp. iii-viii); Introduction (pp. 1-8); Chapters 1-11 (pp. 1-48); Glossary (pp. 49-69), [online]. Available from http://www.vion.com/Vion/files/ccPageContentdocfilenames 50004327055469900v_architecture_guide_437.pdf.

* cited by examiner

*Primary Examiner*—T Nguyen
(74) *Attorney, Agent, or Firm*—Janaki K. Davda; Konrad Raynes & Victor, LLP

(57) ABSTRACT

A system and method for lock caching for compound atomic operations (i.e. a read or write operation to more than one 4-byte word) on shared memory is provided. In a computer system including a memory shared among a plurality of processing entities, for example, multiple threads, a method of performing compound atomic operations comprises providing a pool of locks for synchronizing access to the memory; assigning the locks among the plurality of entities to minimize lock contention; and performing the compound atomic operations using the assigned locks. Each lock may be assigned in accordance with an address of the shared memory from the processing entity's compound atomic operations. Assigning locks may be performed in a manner to minimize concurrent atomic updates to the same or overlapping portions of the shared memory. For example, the addresses of the memory from the compound atomic operations may be aliased in accordance with a known upper bound on the amount of the shared memory that may be affected by any atomic operation.

24 Claims, 3 Drawing Sheets

LOCK CACHING FOR COMPOUND ATOMIC OPERATIONS ON SHARED MEMORY

CROSS-REFERENCE TO RELATED FOREIGN APPLICATION

This application is a non-provisional application that claims priority from the commonly assigned Canadian Patent Application entitled "System and Method for Lock Caching for Compound Atomic Operations on Shared Memory", having Canadian Patent Application Serial No. 2,435,148, filed on Jul. 15 , 2003, by Raul E. Silvera and Robert J. Blainey, which application is incorporated herein by reference in its entirety.

TECHNICAL FIELD

Implementations of the invention are related to the field of shared memory and more particularly to compound atomic operations on shared memory.

BACKGROUND

One area of interest to computer program developers is parallel processing whereby computer code from an application is processed by two or more co-operating processors simultaneously using shared memory. A computer system having two or more co-operating processors coupled to shared memory, an operating system (OS) adapted for parallel processing, such as a multi-tasking, multi-threaded OS, and an application coded in a computer language adapted for parallel processing may provide significant performance advantages over a non-parallel processing implementation of the application.

When programming multiple threads using shared memory, synchronization is often necessary to communicate control commands or data between executing threads. Synchronization may be implemented in a variety of manners including critical sections, barriers, and semaphores. A primitive form of synchronization is the atomic update of a single memory location. In a multi-threaded environment, for example, an atomic update of a shared memory location by one of the threads requires that no other thread can read or modify the shared memory location while the update is happening. Synchronization is used to ensure that two or more threads competing for the same resource (i.e. the shared memory location) wait on the resource until the one thread having the resource is finished.

Often, the lower level instruction sets of many computer processor architectures include specific instructions to atomically update memory in specialized ways. These instructions typically form the basis of other forms of synchronization. Higher level programming languages such as C, C++ or Java include primitives that represent various forms of synchronization. For example, in the OpenMP™ application programming interface (API) extensions to C and C++, there are constructs for critical sections, semaphores, barriers and atomic updates. OpenMP is a trademark of OpenMP Architecture Review Board. These forms of synchronization can be implemented correctly using primitive forms of synchronization as described above but some known implementations require more efficient treatment. OpenMP supports multi-platform shared-memory parallel programming in C/C++ and Fortran on all architectures, including Unix™ platforms and Windows™ NT platforms. In accordance with the OpenMP C and C++ API, (Version 2.0, published March 2002, and available at http://www.openmp.org/specs/mp-documents/cspec20_bars.pdf) for example, there is provided an ATOMIC construct, a pragma or compiler directive to instruct a C/C++ compiler to generate code which ensures that a single memory location is updated atomically. If there are instructions from the target processor's instruction set that match the semantics of the atomic update then use of those instructions is often the best implementation of the construct. If, however, there are no appropriate hardware instructions available, other synchronization implementations are used to ensure that the update is indeed atomic. As an example of this problem, the OpenMP implementation of the ATOMIC pragma on PowerPC™ architecture processors is unable to exploit the available load word and reserve index (lwarx) and store word conditional index (stcwx) instructions for compound atomic updates of data items larger than 4 bytes (e.g. double or long long data types).

A common implementation of these compound atomic operations (i.e. reads and writes to more than one 4-byte word) requires acquiring a semaphore or lock in another location, updating a particular shared memory location and then releasing the lock. Because there is often ambiguity about which symbols in a computer source code language can refer to which memory locations (e.g. through the use of pointers), a correct solution must ensure that acquisition of a lock for an atomic update guarantees that no other atomic update on the same or overlapping locations in memory can happen concurrently.

One way to ensure this exclusivity is to require all atomic updates in a program to acquire a single shared lock. The problem with this solution is that threads are likely to contend for that single shared lock when, in fact, they are not contending to update the same or overlapping locations in memory.

The following pseudo-code illustrates an exemplary contention:

```
double *p, *q;
#pragma atomic
*p += x
...
#pragma atomic
*q += y
```

In the example, the updates of the memory pointed to by p and q must be done exclusively only if p and q point to overlapping storage. If an implementation of the atomic construct uses a single shared lock and p and q do not, in fact, point at overlapping storage, then there may be unnecessary contention due to the shared lock.

A solution to some or all of these shortcomings is therefore desired.

SUMMARY

The present invention is directed to a system, method, and computer program product for lock caching for compound atomic operations on shared memory.

For a computer system including a memory shared among a plurality of processing entities, there is provided a method of performing compound atomic operations by the processing entities. The method comprises providing a pool of locks for synchronizing access to the memory; assigning the locks among the plurality of entities to minimize lock contention; and performing the compound atomic operations using the assigned locks.

In accordance with a feature of this aspect, each lock may be assigned in accordance with an address of the shared memory from the entity's compound atomic operations. Assigning may comprise selecting a lock from the pool to minimize concurrent atomic updates to the same or overlapping portions of the shared memory. Selecting may comprise aliasing the addresses in accordance with a known upper bound on the amount of the shared memory that may be affected by any atomic operation.

In accordance with a further feature, the method comprises configuring the pool of locks in accordance with a count of the plurality of processing entities expected to contend for the locks.

Further, the step of performing comprises, for each respective processing entity, synchronizing the entity in accordance with the availability of the lock assigned to the entity and further comprises releasing the lock assigned to the entity.

In accordance with another feature, the method includes providing a software tool to generate instructions for the computer system to define the pool and a mechanism to use said pool, the mechanism adapted to assign the locks.

The software tool may be adapted to generate instructions to define said processing entities, said entities including instructions to use said mechanism to perform said steps of assigning and performing. Optionally, the software tool operates in accordance with a standard for shared-memory parallel processing.

In accordance with another aspect of the invention, there is provided a lock sharing system for performing compound atomic operations in a computer system including a memory shared among a plurality of processing entities. The lock sharing system comprises a pool of locks for synchronizing access to the memory; and a mechanism for sharing the locks among the plurality of entities to minimize lock contention, said processing entities adapted to perform the compound atomic operations using the assigned locks.

The mechanism may be adapted to assign each lock in accordance with an address of the shared memory from the entity's compound atomic operations. The mechanism may selects a lock from the pool to minimize concurrent atomic updates to the same or overlapping portions of the shared memory. Further, the mechanism can be adapted to alias the addresses in accordance with a known upper bound on the amount of the shared memory that may be affected by any atomic operation.

As a feature of the lock sharing system, the pool is configured in accordance with a count of the plurality of processing entities expected to contend for the locks.

Further, the mechanism may comprise a component to synchronize the processing entity in accordance with the availability of the lock assigned to the processing entity and, additionally, a component to release the lock assigned to the processing entity.

In accordance with a further feature, the lock sharing system includes a software tool component configured to generate instructions for the computer system for defining the pool and mechanism. The software tool component may further generate instructions to define the processing entities including instructions to use the pool and mechanism. Optionally, the software tool component operates in accordance with a standard for shared-memory parallel processing.

In accordance with another aspect, there is provided a software tool for generating instructions to perform compound atomic operations using shared locks to minimize lock contention. More particularly, there is provided a computer program product having a computer readable medium tangibly embodying computer executable code for generating instructions for a computer system including a memory to be shared among a plurality of processing entities. The computer program product of this aspect comprises code to define a pool of locks for synchronizing access to the memory; code to define a mechanism for sharing the locks among the plurality of entities to minimize lock contention; and code to define the plurality of processing entities, said processing entities adapted to perform compound atomic operations using the mechanism. Optionally, the computer program product is configured in accordance with a standard for shared-memory parallel processing.

In accordance with yet another aspect of the invention there is provided a computer program product having a computer readable medium tangibly embodying computer executable code for performing compound atomic operations in a computer system including a memory to be shared among a plurality of processing entities. This computer program product comprises code defining a pool of locks for synchronizing access to the memory; code defining a mechanism for sharing the locks among the plurality of entities to minimize lock contention; and code defining the plurality of processing entities, said processing entities adapted to perform compound atomic operations using the mechanism.

BRIEF DESCRIPTION OF THE DRAWINGS

Further features and advantages of aspects of the present invention will become apparent from the following detailed description, taken in combination with the appended drawings, in which.

It will be noted that throughout the appended drawings, like features are identified by like reference numerals.

DETAILED DESCRIPTION

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in C/C++ computer programming language. Any limitations presented would be a result of a particular type of operating system, data processing system, or computer programming language, and thus would not be a limitation of the present invention.

Figure 1:
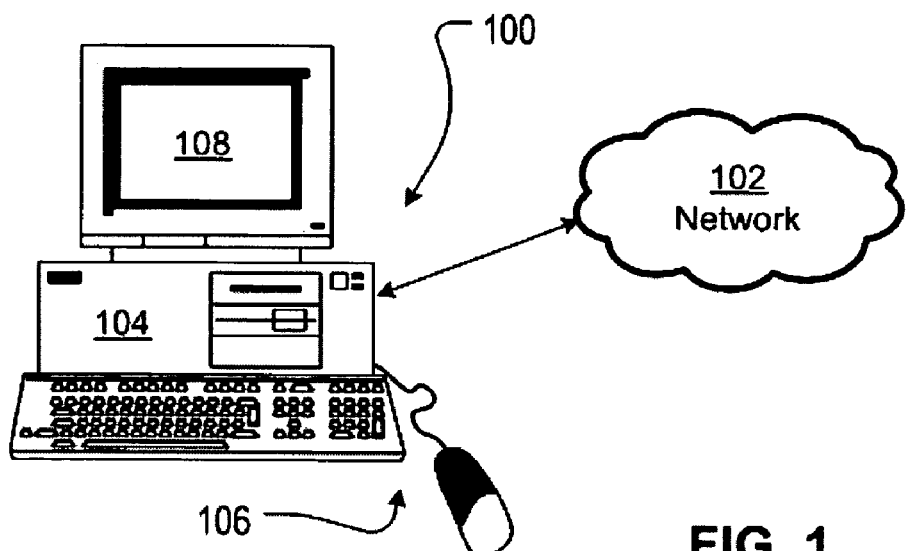
FIG. 1 schematically illustrates a computer system embodying aspects of the invention.

An embodiment of the invention, computer system 100, is illustrated in FIG. 1. A computer system 100, which is illustrated for exemplary purposes as a computing device, is adapted to communicate with other computing devices (not shown) using network 102. As will be appreciated by those of ordinary skill in the art, network 102 may be embodied using conventional networking technologies and may include one or more of the following: local networks, wide area networks, intranets, the Internet, and the like.

Through the description herein, an embodiment of the invention is illustrated with aspects of the invention embodied solely on computer system 100. Aspects of the invention may be distributed amongst one or more networked computing devices which interact with computer system 100 using one or more networks such as, for example, network 102. However, for ease of understanding, aspects of the invention have been embodied in a single computing device—computer system 100.

Computing device 100 typically includes a processing system 104 which is enabled to communicate with the network 102, and various input devices 106 and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 104. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
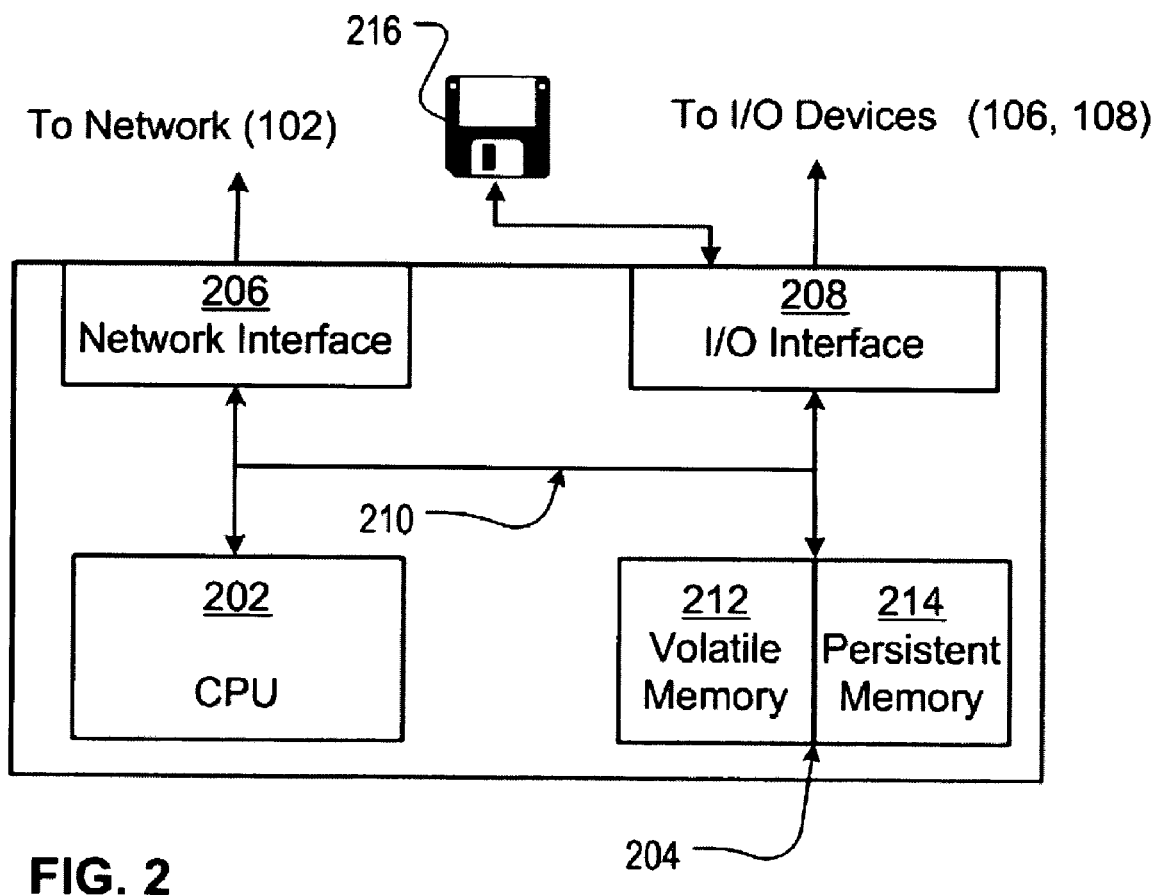
FIG. 2 schematically illustrates, in greater detail, a portion of the computer system of FIG. 1.

Exemplary processing system 104 is illustrated in greater details in FIG. 2. As illustrated, processing system 104 includes: two central processing units (CPUs) 202A and 202B, collectively 202, memory 204, network interface (I/F) 206 and input-output interface (I/O I/F) 208. Communication between various components of the processing system 104 may be facilitated via a suitable communications bus 210 as required.

CPU 202 is a processing unit, such as an IBM PowerPC™, Intel Pentium™, Sun Microsystems UltraSparc™ processor, or the like, suitable for the operations described herein. As will be appreciated by those of ordinary skill in the art, other embodiments of processing system 104 could use alternative CPUs and may include embodiments in which only one or more than two CPUs are employed (not shown). CPUs 202 may include various support circuits to enable communication with the other components of the processing system 104.

Memory 204 includes both volatile memory 212 and persistent memory 214 for the storage of: operational instructions for execution by CPUs 202, data registers, and the like. Memory 204 preferably includes a combination, possibly arranged in a hierarchy, of random access memory (RAM), read only memory (ROM) and persistent memory such as that provided by a hard disk drive, flash memory, or both.

Network I/F 206 enables communication between computing device 100 and other network computing devices (not shown) via network 102. Network I/F 206 may be embodied in one or more conventional communication devices. Examples of a conventional communication device include: an Ethernet card, a token ring card, a modem, or the like. Network I/F 206 may also enable the retrieval or transmission of instructions for execution by CPUs 202, from or to a remote storage media or device via network 102.

I/O I/F 208 enables communication between processing system 104 and the various I/O devices 106 and 108. I/O I/F 208 may include, for example, a video card for interfacing with an external display such as output device 108. Additionally, I/O I/F 208 may enable communication between processing system 104 and a removable media 216. Removable media 216 may comprise a conventional diskette or other removable memory devices such as Zip™ drives, flash cards, CD-ROMs, static memory devices and, the like.

Removable media 216 may be used to provide instructions for execution by CPUs 202 or as a removable data storage device.

Figure 3:
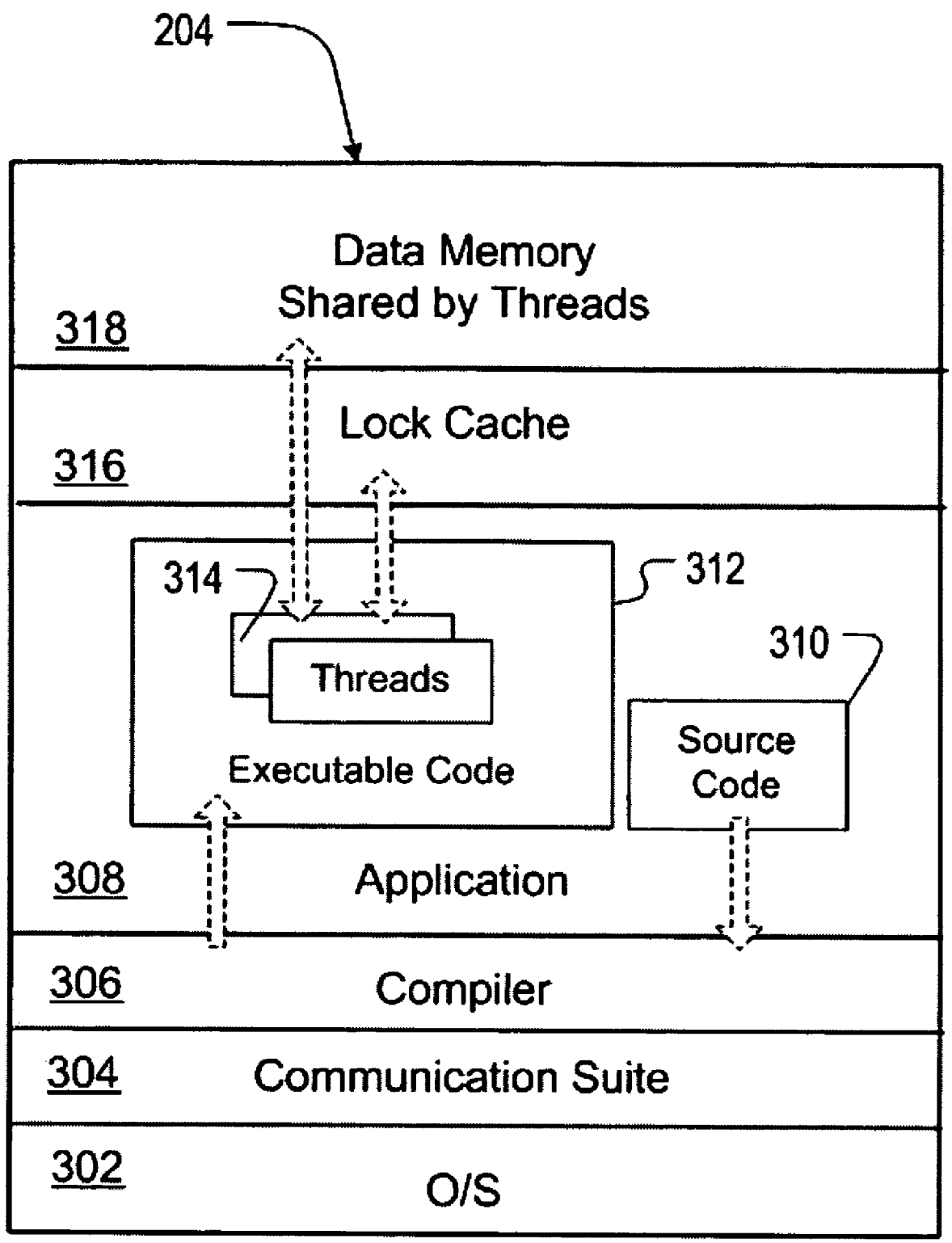
FIG. 3 illustrates a memory portion of the computer system of FIG. 2.

Computer instructions/applications stored in memory 204 and executed by CPUs 202 (thus adapting the operation of the computer system 100 as described herein) are illustrated in functional block form in FIG. 3. As will be appreciated by those of ordinary skill in the art, the discrimination between aspects of the applications illustrated as functional blocks in FIG. 3 is somewhat arbitrary in that the various operations attributed to a particular application as described herein may, in an alternative embodiment, be subsumed by another application.

As illustrated for exemplary purposes only, memory 204 stores instructions and data for enabling the operation of lock caching for compound atomic operations on shared memory, comprising: an operating system (OS) 302, a communication suite 304, a compiler 306, an application 308 comprising computer source code 310 and executable code 312, lock cache 316 and a portion 318 of shared memory 204 where processes, threads or other processing entities 314 of application 308 may contend for atomic operations.

OS 302 is an operating system suitable for operation with selected CPUs 202 and the operations described herein. Multi-tasking, multi-threaded OSes such as, for example, Microsoft Windows 2000™, UNIX™ or other UNIX-like OSes such as IBM AIX™, Linux™, etc. are expected to be preferred in many embodiments. Communication suite 306 provides, through interaction with OS 302 and network I/F 206 (FIG. 2), suitable communication protocols to enable communication with other networked computing devices via network 102 (FIG. 1). Communication suite 304 may include one or more of such protocols such as TCP/IP, Ethernet, token ring and the like. Communication suite 304 preferably includes a synchronous transport communication capabilities for communicating with other computing devices.

Compiler 306 is a software application for compiling and linking computer source code to create executable code for execution by CPUs 202 in the environment provided by OS 302 and communications suite 304. Application 308 comprises source code 310 for compiling and linking by compiler 306 and executable code 312 produced thereby for use during runtime. Instructions of application 308 define or produce when compiled compound atomic operations (not shown) with respect to shared memory 204.

In accordance with an embodiment of the invention, compiler 306 is adapted to generate executable code which, when run, shares a plurality of shared memory locks from cache 316 among the processes, threads or other processing entities, collectively 314, of application 308 that share a portion 318 of memory 204 and perform compound atomic operations with the shared portion 318. Though portion 318 is shown as a single contiguous block of memory 204, it may comprise one or more contiguous blocks.

In the exemplary embodiment, the locks are themselves implemented as a portion of memory 204, defined as a lock cache 316, i.e. a pool or other storage construct of memory 204 that may be reserved by a first one of the entities 314 to lock out one or more other entities 314 from updating a particular part of portion 318 while the first one of the entities performs a compound atomic operation. In accordance with this embodiment, the lock cache is facilitated by a lookup function (not shown) to determine which lock of the lock cache 316 is associated with a particular memory address of portion 318 to be locked, a lock acquire function to reserve the determined lock during the atomic operations and a lock release function to give back the lock for re-use by the same or another of the entities 314.

In accordance with the exemplary embodiment, directives may be used in the source code of application 308 to instruct compiler 306 to invoke the pooled locking scheme. For example, the following pseudo-code illustrates a source code fragment for two or more of entities 314 and a representation of the code fragment generated by compiler 306 to implement the lock:

| Entity Code | Generated Code Fragment |
|---|---|
| #pragma atomic<br>*p += x | lock = lock_cache.lookup (p)<br>lock.acquire( );<br>*p += x<br>lock.release( ); |

In accordance with object oriented programming principles, which persons of ordinary skill in the art will understand are not necessary to implement the invention, lock_cache lookup returns a lock object from a cache 316 (lock_cache) of such objects for a particular memory address pointed to by pointer variable p. The lookup determines the appropriate lock for the memory address from the cache but does not invoke the lock. Rather the lock object has a method (acquire) for synchronizing a requesting entity in accordance with the availability of the lock. If the lock is reserved by another entity, the acquire method waits or locks out the requesting entity until the lock is available. Advantageously, a requesting entity is not locked out when another requesting entity is performing atomic operations if that other requesting entity's memory address does not map to the same lock.

Persons of ordinary skill in the art will recognize that multiple different addresses might refer to overlapping storage such as is illustrated by the code fragment:

| Entity Code |
|---|
| char *cp;<br>double *dp;<br>dp = &(x[i]);<br>cp = (char *)dp + 4;<br>#pragma atomic<br>*dp += x<br>...<br>#pragma atomic<br>*cp += y |

In this case, the same lock should be used to guard both atomic updates because the updates may use and modify the same memory location (dp+4). In accordance with a standard or other convention (e.g. OpenMP) where the target of an atomic update must be a scalar variable, the following embodiment may be usefully employed.

Where there is a known upper bound on the amount of storage that might be modified by any given atomic update (i.e. the largest scalar type that is supported) an appropriate cache lookup may be tuned. For example, if the largest supported type is 16 bytes long, a cache lookup using the next lower 32-byte aligned address instead of the target address can be performed and be assured that any pointers that might address overlapping storage will use the same lookup key.

The following the pseudo-code fragment illustrates such a tuned locking scheme (based on a maximum scalar size of 16 bytes):

| Entity Code | Generated Code |
|---|---|
| #pragma atomic<br>*p += x | lock = lock_cache.lookup (p >> 5)<br>lock.acquire( );<br>*p += x<br>lock.release( ); |

It will be appreciated by those of ordinary skill in the art that the 5 bit shift applied to the address key p may be alternatively performed as an AND operation (e.g. p & 0xFFFFFE00) but the shift achieves the desired aliasing of a key to the lock cache and is computationally faster.

The size of the cache (alternately, the number of bits of the address used in the lookup) is a tuning parameter since the cache size should be larger when a larger number of threads are active.

Figure 4A:
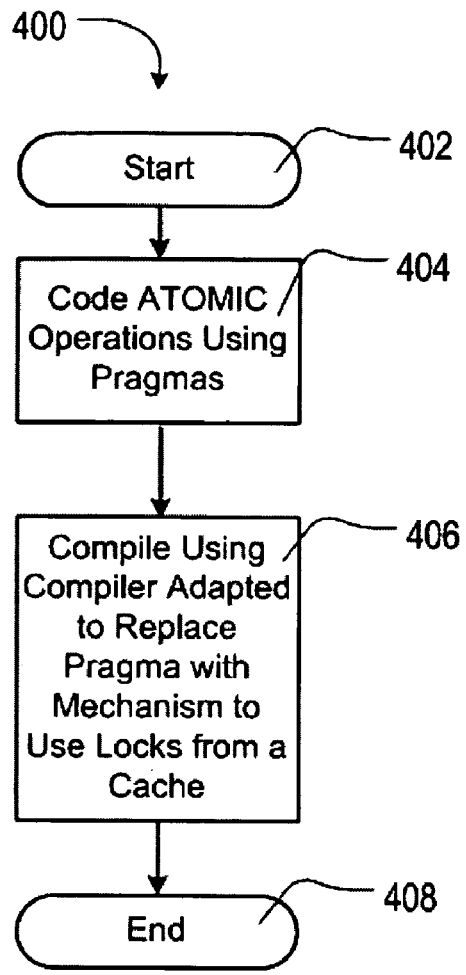
FIGS. 4A and 4B are flowcharts illustrating operational steps involved in an embodiment of the invention.

FIG. 4A illustrates operations 400 involved in coding and compiling an application in accordance with an embodiment of the invention. Following a start (step 402), a developer or other programmer writes computer source code (Step 404) which, when executed, performs instructions for compound atomic operations using a specific memory location. The memory location may be shared with one or more processes, threads or other entities but need not be. The source code includes pragmas or other compiler directives, as discussed previously, for instructing the compiler to provide executable code that obtains a lock from a lock cache in accordance with the memory location to be updated, locks the lock to prevent other entities from updating the location, performs the update and releases the lock. The code is compiled using a compiler adapted to receive the pragmas and produce the executable code (Step 406) and the operations 400 end (Step 408).

Figure 4B:
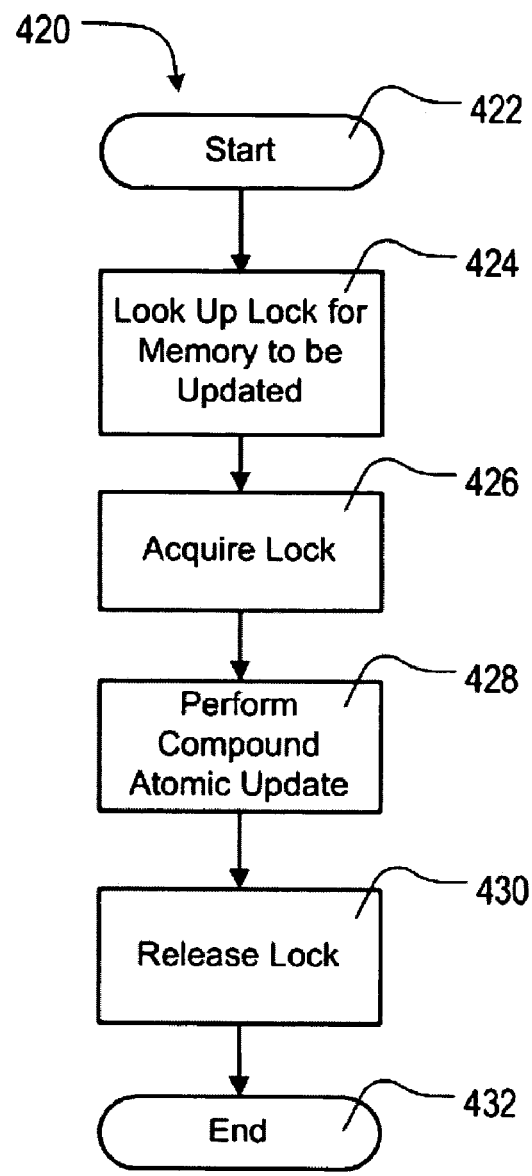

FIG. 4B illustrates operations 420 involved at runtime for the executable code produced by operations 400. At start step 422, a thread of the application produced by the compiler 306 and including instructions for performing compound atomic operations is executed. The executable code obtains (e.g. by way of a lookup method or function) a lock from the cache 316 for a particular address of data memory 318 to be atomically updated (Step 424). In accordance with an embodiment of the invention, the memory address may be shifted or otherwise aliased to provide a key to the lock cache for assigning a particular lock from among the pool of locks maintained by the cache for the shared memory block 318. Once the particular lock is obtained, for example, by returning a lock object to the thread, the lock may be acquired exclusively by the thread to prevent other executing entities from updating the particular address (Step 426).

It will be appreciated that modifications and extensions to the embodiments described may be made without departing from the scope of the invention. For example, it is described that compiler 306 may be instructed using directives to generate code for implementing the lock cache for compound directives. Other mechanisms, whether automatic or user initiated such as by direct programming, may be used to invoke a lock cache implementation.

It will be appreciated that modifications and extensions to the embodiments described may be made without departing from the scope of the invention. For example, it is described that compiler 306 may be instructed using directives to generate code for implementing the lock cache for compound operations. Other mechanisms may be used to invoke a lock cache implementation and may be automated or more user initiated such as by direct programming.

Additionally, alternative software tools to compiler 306 may be adapted to provide lock caching in accordance with the invention. Such software tools may include interpreters, editors, preprocessors and the like.

The invention applies to shared memory that is shared among two or more processes/threads in a single processor system as well. Lock contention may be minimized in such a system by sharing locks from a cache or other mechanism in accordance wit the invention.

The embodiments of the invention described above are intended to be exemplary only. The scope of the invention is therefore intended to be limited solely by the scope of the appended claims.

We claim:

1. In a computer system including a memory shared among a plurality of processing entities, a method of performing compound atomic operations by said processing entities comprising:

providing a pool of locks for synchronizing access to the memory;

sharing the locks among the plurality of processing entities to minimize lock contention, wherein a lock is selected from the pool to minimize concurrent atomic updates to same or overlapping portions of the shared memory by aliasing memory addresses in accordance with a known upper bound on an amount of the shared memory that is capable of being effected by an atomic operation; and performing the compound atomic operations using assigned locks.

2. The method of claim 1 wherein each lock is assigned in accordance with an address of the shared memory from an entity's compound atomic operations.

3. The method of claim 1 comprising configuring the pool of locks in accordance with a count of the plurality of processing entities expected to contend for the locks.

4. The method of claim 1 wherein performing comprises, for each respective processing entity, synchronizing the entity in accordance with availability of a lock assigned to the entity.

5. The method of claim 4 comprising releasing the lock assigned to the entity.

6. The method of claim 1 including providing a software tool to generate instructions for said computer system to define said pool and a mechanism to use said pool.

7. The method of claim 6 wherein said software tool further generates instructions to define said processing entities, said entities including instructions to use said mechanism to perform assigning and performing.

8. The method of claim 6 wherein said software tool operates in accordance with a standard for shared-memory parallel processing.

9. In a computer system including a memory shared among a plurality of processing entities, a lock sharing system for performing compound atomic operations by said processing entities comprising:

a pool of locks for synchronizing access to the memory; and a mechanism for sharing the locks among the plurality of processing entities to minimize lock contention, said processing entities adapted to perform the compound atomic operations using assigned locks, the mechanism adapted to select a lock from the pool to minimize concurrent atomic updates to same or overlapping portions of the shared memory by aliasing memory addresses in accordance with a known upper bound on an amount of the shared memory that is capable of being effected by an atomic operation.

10. The lock sharing system of claim 9 wherein said mechanism is adapted to assign each lock in accordance with an address of the shared memory from an entity's compound atomic operations.

11. The lock sharing system of claim 9 wherein the pool is configured in accordance with a count of the plurality of processing entities expected to contend for the locks.

12. The lock sharing system of claim 9 wherein the mechanism comprises a component to synchronize a processing entity in accordance with availability of a lock assigned to the processing entity.

13. The lock sharing system of claim 12 wherein the mechanism comprises a component to release the lock assigned to the processing entity.

14. The lock sharing system of claim 9 including a software tool component configured to generate instructions for said computer system for defining said pool and mechanism.

15. The lock sharing system of claim 14 wherein said software tool component further generates instructions to define said processing entities, said entities including instructions to use said pool and mechanism.

16. The lock sharing system of claim 14 wherein said software tool component operates in accordance with a standard for shared-memory parallel processing.

17. A computer program product having a computer readable medium tangibly embodying computer executable code for generating instructions for a computer system including a memory to be shared among a plurality of processing entities, said computer program product comprising:

code to define a pool of locks for synchronizing access to the memory;

code to define a mechanism for sharing the locks among the plurality of processing entities to minimize lock contention, wherein a lock is selected from the pool to minimize concurrent atomic updates to same or overlapping portions of the shared memory by aliasing memory addresses in accordance with a known upper bound on an amount of the shared memory that is capable of being effected by an atomic operation; and code to define the plurality of processing entities, said processing entities adapted to perform compound atomic operations using the mechanism.

18. The computer program product of claim 17 wherein the mechanism is adapted to assign a lock to a processing entity in accordance with an address of the shared memory from the processing entity's compound atomic operations.

19. The computer program product of claim 17 wherein the code to define the pool is configured in accordance with a count of the plurality of processing entities expected to contend for the locks.

20. The computer program product of claim 17 configured in accordance with a standard for shared-memory parallel processing.

21. A computer program product having a computer readable medium tangibly embodying computer executable code for performing compound atomic operations in a computer system including a memory to be shared among a plurality of processing entities, said computer program product comprising:
- code defining a pool of locks for synchronizing access to the memory;
- code defining a mechanism for sharing the locks among the plurality of processing entities to minimize lock contention, wherein a lock is selected from the pool to minimize concurrent atomic updates to same or overlapping portions of the shared memory by aliasing memory addresses in accordance with a known upper bound on an amount of the shared memory that is capable of being effected by an atomic operation; and
- code defining the plurality of processing entities, said processing entities adapted to perform compound atomic operations using the mechanism.

22. The computer program product of claim 21 wherein the mechanism is adapted to assign a lock to a processing entity in accordance with an address of the shared memory from the processing entity's compound atomic operations.

23. The computer program product of claim 21 wherein the pool is configured in accordance with a count of the plurality of processing entities expected to contend for the locks.

24. The computer program product of claim 21 wherein said code is defined by a software tool configured in accordance with a standard for shared-memory parallel processing.

* * * * *